United States Patent
Arya et al.

(10) Patent No.: US 12,306,743 B2
(45) Date of Patent: May 20, 2025

(54) TEST CASE GENERATION

(71) Applicant: International Business Machines Corporation, Armonk, NY (US)

(72) Inventors: Vijay Arya, Gurgaon (IN); Diptikalyan Saha, Bangalore (IN); Devika Sondhi, Noida (IN); Kahini Wadhawan, Ferozepur (IN)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 18/115,279

(22) Filed: Feb. 28, 2023

(65) Prior Publication Data
US 2024/0289260 A1 Aug. 29, 2024

(51) Int. Cl.
G06F 11/36 (2025.01)
G06F 11/3604 (2025.01)
G06F 11/3668 (2025.01)
G06N 3/08 (2023.01)

(52) U.S. Cl.
CPC ...... *G06F 11/3684* (2013.01); *G06F 11/3608* (2013.01); *G06N 3/08* (2013.01)

(58) Field of Classification Search
CPC . G06F 11/3608; G06F 11/3684; G06N 20/00; G06N 5/01
See application file for complete search history.

(56) References Cited

U.S. PATENT DOCUMENTS 8,276,122 B2 9/2012 Allen et al.
8,924,938 B2 12/2014 Chang et al.
2011/0289488 A1* 11/2011 Ghosh ................ G06F 11/3684 717/131
2022/0058072 A1* 2/2022 Poghosyan ....... G06F 18/24317

FOREIGN PATENT DOCUMENTS

CN 112306846 B 2/2022

OTHER PUBLICATIONS

Papadopoulos, P., et al., "Black-Box Test Generation from Inferred Models", 2015 IEEE/ACM 4th International Workshop on Realizing AI Synergies in Software Engineering, May 2015, pp. 19-24.
Chen, B., et al., "CodeT: Code Generation with Generated Tests", arXiv:2207.10397v1 [cs.CL], Jul. 21, 2022, 12 pagse.
Liu, H., et al., "Few-Shot Parameter-Efficient Fine-Tuning is Better and Cheaper than In-Context Learning", arXiv:2205.05638v2 [cs. LG], Aug. 26, 2022, 23 pages.

(Continued)

*Primary Examiner* — Hanh Thi-Minh Bui
(74) *Attorney, Agent, or Firm* — Scully, Scott, Murphy & Presser, P.C.; Jordan Schiller

(57) ABSTRACT

A processor can receive input data to a computer code and output data that the computer code produces corresponding to the input data. Based on the input data and the output data, the processor can build a decision tree that links input conditions to the output data. Using the input conditions, the processor can run a condition generator model created by fine-tuning a pre-trained programming language model, where the condition generator model predicts next condition that is likely to occur in the computer code. Based on the next condition, the processor can generate input instances and run the computer code using the generated input instances. Based on output instances output by the computer code based on the generated input instances, the processor can detect at least one flow path in the computer code, which had not been previously built in the decision tree.

17 Claims, 8 Drawing Sheets

(56) References Cited

OTHER PUBLICATIONS

Fatima, S., et al., "Flakify: A Black-Box, Language Model-Based Predictor for Flaky Tests", IEEE Transactions on Software Engineering, arXiv:2112.12331v3 [cs.SE], Aug. 16, 2022, 17 pages.

Feng, Z., et al., "CodeBERT: A Pre-Trained Model for Programming and Natural Languages", repositoarXiv:2002.08155v4 [cs.CL], Sep. 18, 2020, 12 pages.

Guo, D., et al., Graphcodebert: Pre-Training Code Representations With Data Flow, Published as a conference paper at ICLR 2021, arXiv:2009.08366v4 [cs.SE], Sep. 13, 2021, 18 pages.

Karmakar, A., et al., "What do pre-trained code models know about code?", arXiv:2108.11308v1 [cs.SE], Aug. 25, 2021, 5 pages.

Stack Exchange Inc., "How is GPT able to handle large vocabularies?", https://datascience.stackexchange.com/questions/77541/how-is-gpt-able-to-handle-large-vocabularies, Printed on Dec. 20, 2022, 2 pages.

Hugging Face, "The AI community building the future", https://huggingface.co/, Printed on Dec. 20, 2022, 6 pages.

Briand, L.C., et al., "Using Machine Learning to Refine Black-Box Test Specifications and Test Suites", The Eighth International Conference on Quality Software, Aug. 2008, pp. 135-144.

Briand, L.C., et al., "Using Machine Learning to Refine Black-Box Test Specifications and Test Suites", Carleton University, TR SCE-07-05, Sep. 2007, pp. 1-15.

\* cited by examiner

TEST CASE GENERATION

BACKGROUND

The present application relates generally to computers and computer applications, and more particularly to test case generation, for example using pretrained programming language models.

Black-box testing can be expensive but is often used to test application programming interfaces (APIs) deployed on cloud, auto-translated source code, code that is migrated during app modernization or cloud migration, or another code. A challenge in black box testing of any software is to efficiently generate test inputs that cover most or all possible execution paths in the source code. While a brute force search may be employed where the software to be tested may be exhaustively invoked on the entire input space, this results in an exponential number of calls to the software which can be expensive in terms of both time and computation resources, and may be inefficient as the number of invocations spent to discover a new execution path can be very high. For instance, with N binary inputs, one may need to perform $2^N$ calls.

BRIEF SUMMARY

The summary of the disclosure is given to aid understanding of a computer system and method of test generation, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method in an aspect can include receiving at least input data to a computer code and output data that the computer code produces corresponding to the input data. The method can also include, based on the input data and the output data, building a decision tree that links input conditions to the output data. The method can also include using the input conditions, running a condition generator model created by fine-tuning a pre-trained programming language model, the condition generator model predicting a next condition that is likely to occur in the computer code. The method can also include, based on the next condition, generating input instances and running the computer code using the generated input instances. The method can also include, based on output instances output by the computer code based on the generated input instances, detecting at least one flow path in the computer code, which had not been previously built in the decision tree.

A system in an aspect can include at least one computer processor. The system can also include at least one memory device coupled with the at least one computer processor. The at least one computer processor can be configured to receive at least input data to a computer code and output data that the computer code produces corresponding to the input data. The at least one computer processor can also be configured to, based on the input data and the output data, build a decision tree that links input conditions to the output data. The at least one computer processor can also be configured to, using the input conditions, run a condition generator model created by fine-tuning a pre-trained programming language model, the condition generator model predicting a next condition that is likely to occur in the computer code. The at least one computer processor can also be configured to, based on the next condition, generate input instances and run the computer code using the generated input instances. The at least one computer processor can also be configured to, based on output instances output by the computer code based on the generated input instances, detect at least one flow path in the computer code, which had not been previously built in the decision tree.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
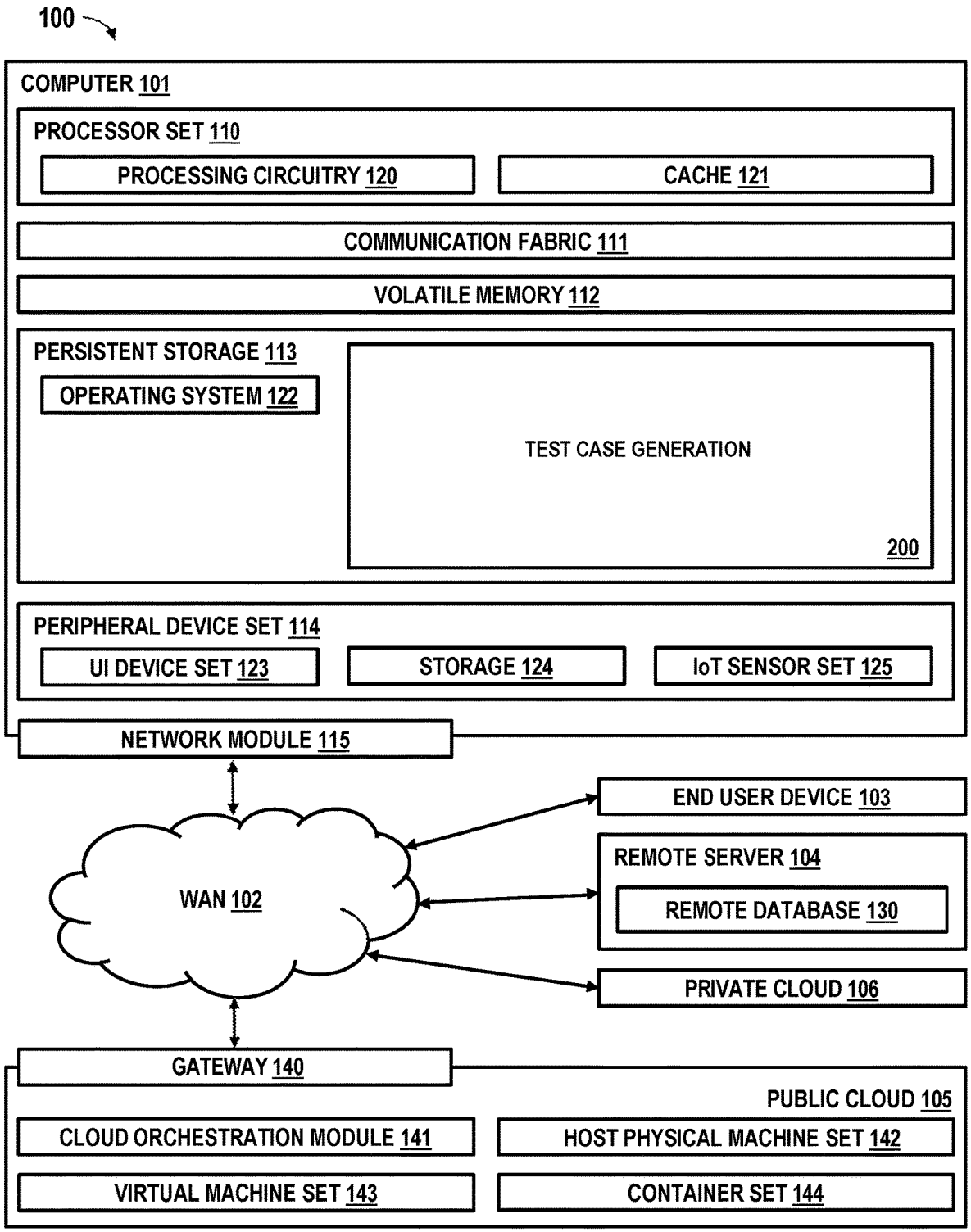
FIG. 1 shows an example of a computing environment, which can implement test case generation, e.g., via pretrained programming language models, in an embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as new test case generation algorithm or code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Black box testing may be used to test functionalities of software components where knowledge of the internal code is either unavailable or only partially available. For example, in black box testing, software components are run with a variety of possible inputs to test what outputs those software components generate and/or whether the software components generate correct outputs.

In one or more embodiments, system, method and/or technique can be provided that can efficiently generate test inputs that may cover most or all possible execution paths in the source code, for example, where the source code itself may not be available or accessible. Execution path is also referred to as a program path or code path, e.g., a flow of a control of a program during program's run. In one or more embodiments, the system, method and/or technique leverage pretrained programming language models to improve the efficiency of test case generation, for example, so that black box testing of software can be improved.

Pretrained programming language models such as transformer-based pre-trained programming language models are available, which are trained using large volumes of publicly available source-code dataset. Enterprises retrain such models on their codebase to create enterprise foundation models for several AI-assisted coding tasks such as code translation, auto-completion, summarization, and clone detection. In one or more embodiments, system, method and/or technique reuse such existing pretrained models, which would already be available within enterprises, to improve the efficiency of test case generation.

As examples of some use cases, consider the following scenarios. Testing APIs allows for validating software integration and continuous integration and continuous deployment (CI/CD) process. Developers may build software by integrating various internal or open APIs. Developers also release and/or update software components as cloud microservices which are invoked and consumed as APIs. A faulty API can impact numerous applications that depend on it. Therefore, a thorough testing of APIs can help minimize errors. As another example, testing migrated code and/or auto-translated code efficiently can be useful. In application modernization, legacy applications are migrated from large monolithic applications written in languages such as COBOL to loosely coupled applications written in Java and/or Python based on a micro-service architecture for deployment on cloud. Artificial intelligence (AI)-based automation is used to assist such migration. In these scenarios, tests can be employed to verify the equivalence of the original and migrated and/or translated code.

A system uses one or more pretrained programming language models to improve the efficiency of black-box test case generation for software components such as APIs. The system can output test cases that explore different execution paths in the software source code. The system can use existing input-output pairs based on response of calls to software component and can build a surrogate decision tree model or any other directly interpretable model. The system can read existing conditions on each path of the decision tree and can add new conditions by predicting these using a condition generator model. The system can build a condition generator model by fine tuning a programming language foundation model that is pretrained on enterprise source code, and/or public source code. The system can include a condition-extractor module that extracts conditions needed to fine tune the condition generator model.

For example, available pretrained source-code language models are available, which may be fine-tuned on enterprise data and used for AI assisted coding tasks by enterprises. Examples of AI assisted coding tasks can include code auto-completion, code translation, code clone detection, code summarization, text-to-code generation, method naming, algorithm detection, and/or others. Customized pre-trained programming language models, which are trained on large volumes of public source-code and retrained on enterprise source-code, may be used for multiple coding tasks within enterprises. Some of these models even consume semantic-level level information such as data flow, in the pre-training stage. The system in an embodiment can reuse such existing pretrained models, which would already be available within enterprises, to improve the efficiency of test case generation.

In an embodiment, the system can use a transformer-based pretrained programming language model for black-box testing of software components such as APIs, auto-translated code, applications migrated to the cloud, and or other code. The system may minimize the use of brute force search over the input space to explore possible execution paths in the source code. The system can include a condition generator AI model that efficiently computes new test inputs to explore new execution paths in the source code. The condition generator AI model can be built by fine-tuning a transformer-based programming language foundation model that is pretrained on enterprise source code. For instance, the foundation models can be one or more of GraphCodeBERT, CodeBERT, CuBERT, and/or others, which are trained on enterprise source code including semantic-level information such as data flow graphs. For example, sch foundation models are pretrained on the CodeSearchNet dataset extracted from GitHub, which includes a large number of source codes across several different programming languages. Those models learn knowledge of code by training on source code and natural language documentation, with some encoding data-flow information. Such foundation models can be fine-tuned to be enterprise-specific using enterprise-specific source code. The condition generator AI model can be built by leveraging existing foundation models already being used within enterprises. For instance, foundation models being used for several AI-assisted coding tasks (e.g., code auto-completion, code translation, code clone detection, summarization, and/or others) may be reused to build the condition generator model. The system can include a condition-extractor component that generates a small, labeled dataset, which can be used to fine-tune the condition generator AI model. This labeled dataset can include conditions that occur consecutively in the source code and can teach the foundation model to predict the next available test condition within the enterprise source code. For instance, fine-tuning may be performed using well known techniques such as few-shot learning.

In an embodiment, a black-box testing implemented by a system and/or method disclosed herein, and/or using a technique described herein, discovers and explores most or all possible execution paths in the source code, for example, where the source code may not be accessible, for example, where only an executable version is available to run. In one or more embodiments, a pretrained programming language model may be used to discover new execution paths efficiently, i.e., with less computation. FIG. 2 is a flow diagram illustrating a method in an embodiment. The method can be run on or by a computer or computer system, for example, described with reference to FIG. 1. The method can generate test cases for testing software code in an embodiment. At 202, software or program code such as an API, a subset or examples of input data that the software takes as input, and corresponding subset of output data that the software code produces given the input data, can be received. For example, at least input data to a computer code and output data that the computer code produces corresponding to the input data can be received. For instance, the subsets may include a hundred or so (or another quantity) of examples of input data and corresponding output data. The software is a black-box software, for example, a runnable or executable code, where the corresponding source code might not be available or accessible.

Figure 3:
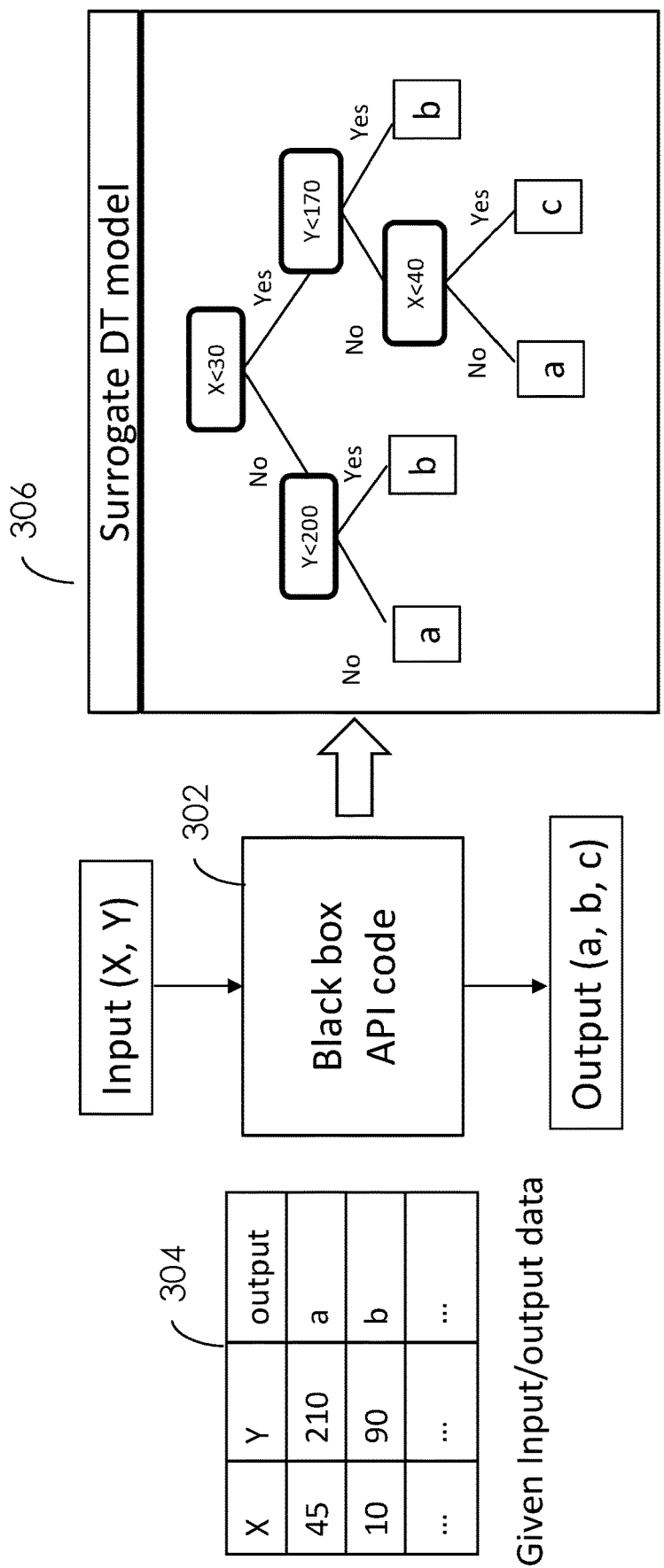
FIG. 3 shows a diagram showing process components in an embodiment.

At 204, based on the examples of input data and output data, as labeled data, the method includes building or training a decision tree to discover execution path of the software. FIG. 3 shows a block diagram showing such processing in an embodiment. A black-box software (e.g., API) 302 along with its input and output data 304 can be given or received. The method may construct a surrogate decision tree (DT) model 306 (or another directly interpretable model) to understand the conditions under which the software produces various outputs. For example, the decision tree can be trained using the labeled data (given input and output data) to provide conditions on the inputs, which the software produces certain outputs. In the example shown at 306, the decision tree provides conditions such as: input X is less than "30" and input Y is less than "170", where the output generated is "b"; input X is not less than "30" and input Y is not less than "200", where the output generated is "a"; and so forth as shown at 306. Thus, based on the available (input, output) data, a partial set of execution paths in the code can be discovered, for example, without the actual source code. For instance, the method is able to discover that if X is less than "30" and Y is less than "170", then a control flow of the code runs through a certain path, and then outputs "b". A path of inputs (e.g., input conditions) leads to an output. For instance, the decision tree links input conditions to output data.

Figure 4A:
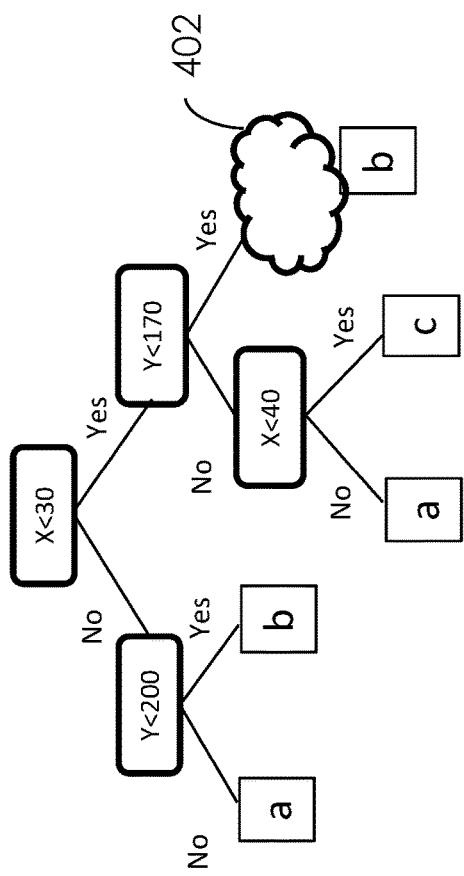
FIGS. 4A-4B show examples of decision trees in an embodiment.

Since the example set 304 may not be an exhaustive set of input and output data for the software 302, the paths built in the decision tree 306 may not show the entire or all execution path in the source code of the software 302. Referring to FIG. 4A, for example, there can be additional execution path or sub-execution path downstream as shown at 402 that resulted in output "b". To find new execution paths in the code, additional input instances may be generated by using constraints obtained from the decision tree 306 (FIG. 3) as a guide. For instance, to discover additional paths corresponding to the cloud region at 402, one may generate data with constraints X<30 and Y<170. This option, e.g., a brute force search, however, can lead to many additional API invocations with relatively few new execution paths being discovered. In an embodiment, the method feeds the existing sequence of conditions to a condition generator model, which is fine-tuned from a pretrained programming language model to obtain a prediction.

Referring back to FIG. 2, the method at 206 can include, to obtain a prediction, feeding the existing sequence of conditions to a condition generator model, which is created by fine-tuning a pretrained programming language model. For instance, a condition generator model created from a pre-trained programming language model is run using the input conditions, where the condition generator model predicts a next condition that is likely to occur in the computer code. The pretrained programming language model can be a model that provides auto-completion to a snippet of software code. Such pretrained programming language model has been pre-trained on the entire enterprise code. Such pretrained programming language model can be fine-tuned to, given a set of conditions, provides a next condition that occurs commonly in the source code of the enterprise. For instance, the condition generator model may provide: Prediction [(X<30), (Y<170)]=(X<22) [confidence 70%]. For instance, the model provides a prediction of next condition (X<22) with confidence of 70%.

At 208, based on this information, the method can generate one or more appropriate input instances to discover a new execution path, which had not been discovered earlier based on available input/output data. The software is run using the generated input instances. For example, based on the next condition, input instances can be generated and the computer code can be run using the generated input instances. At 210, based on output instances output by the computer code using the generated input instances, at least one flow path in the computer code can be detected, which had not been previously built in the decision tree.

Figure 4B:
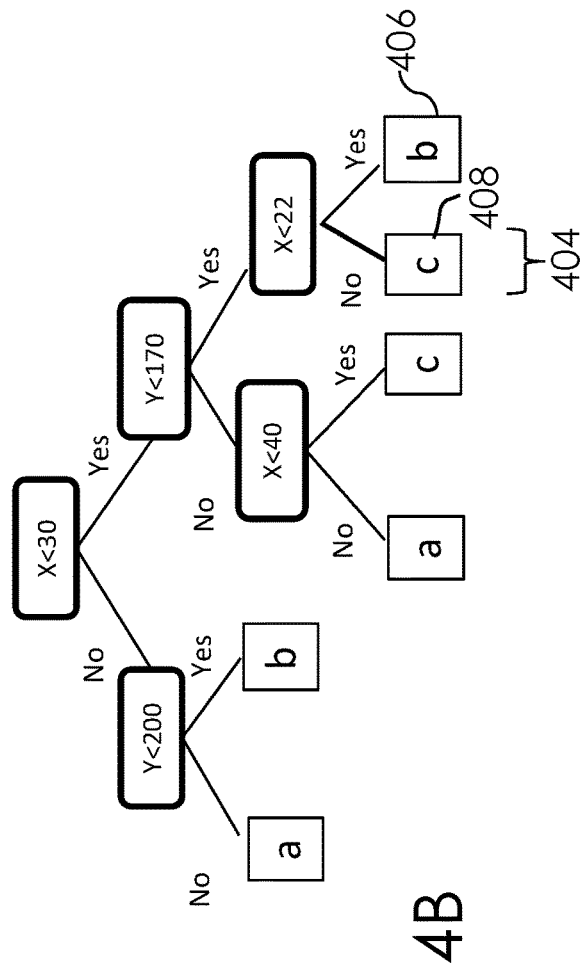

FIG. 4B shows an example of a newly discovered execution path 404 that outputs "c". For example, input instance values that meet the predicted condition and that do not meet the predicted condition can be generated and the software can be run using the generated input instances. For instance, input instance value of X<30, Y<170 and X<22 can be input to the software (e.g., 304 in FIG. 3) and the software run to determine the value that the software produces. In this example, output value of "b" is produced as shown at 406. Similarly, input instance value of X<30, Y<170 and X>=22 can be input to the software (e.g., 304 in FIG. 3) and the software run to determine the value that the software produces. In this example, output value of "c" is produced as shown at 408. A new execution path can be detected, for example, based on the software's output. In an embodiment, if the prediction does not result in a new execution path, the method may revert to the brute force approach at that node (e.g., using X values between 0 and 30, and Y values between 0 and 170, run the software and based on the outputs produced, possibly find one or more new paths).

In an embodiment, the decision tree can be updated with the predicted next condition, for example, as shown at 212. The processing at 206, 208 and 210, 212 can be repeated, to discover one or more additional new execution path. The discovery can end or stop, for instance, if no new additional paths are discovered, for example, the generated input instances do not produce different or branching outputs, e.g., as shown at 406 and 408 in FIG. 4. The discovery can also end or stop, for instance, if the condition generator model does not predict additional conditions, or provides predictions with a confidence value that is less than a threshold value. Such threshold value can be preconfigured.

In an embodiment, fine-tuning the pre-trained programming language model can include extracting input variable conditions from a source code sample; using the extracted input variable conditions, creating a labeled dataset including sequences of conditions; and fine-tuning at least a last layer of the pre-trained programming language model using the labeled dataset including the sequences of conditions to create the condition generator model.

In black-box testing, a brute-force search may result in exponential number of calls to software, which is expensive in terms of time and compute resources. For instance, with N binary inputs, one would need $2^N$ calls. This can be inefficient as the number of software calls spent to discover a new execution path is very high. In one or more embodiments, even if a pretrained model does not achieve 100% accuracy, it can still yield significant savings corresponding to the percentage of the times the accuracy is achieved.

Figure 5:
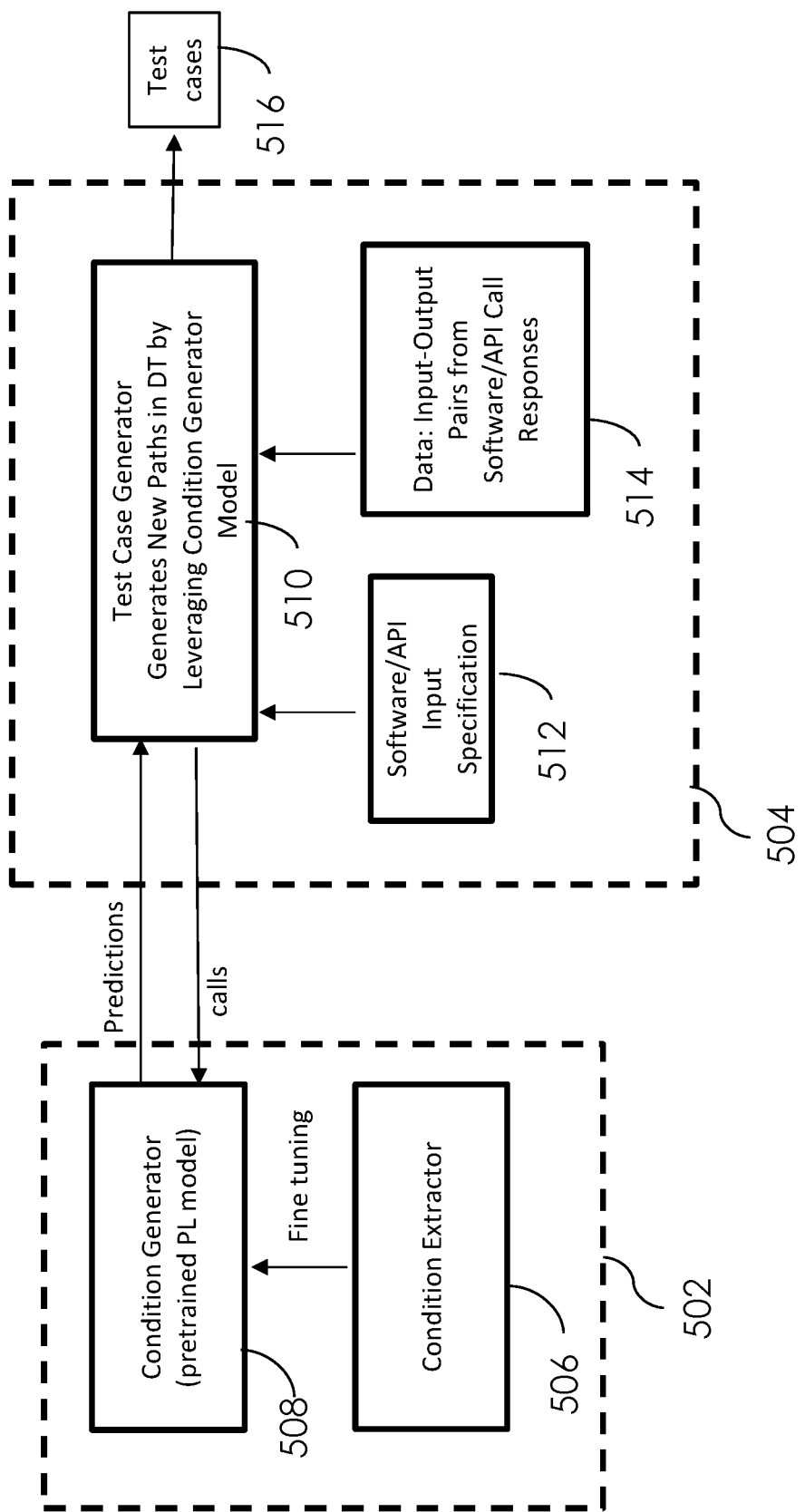
FIG. 5 is a block diagram showing logical components of a system and/or method in an embodiment.

FIG. 5 is a block diagram showing logical components of a system and/or method in an embodiment. The components shown can be computer-implemented components, functions, and/or modules. In an embodiment, black-box testing can be offered as a service, where component 502 can exist within an enterprise and component 504 can exist outside the enterprise. Component 502 can be invoked via an API call. A condition extractor 506 in component 502 fine tunes an existing pre-trained foundation model to create a condition generator 508. Test case generator 510 invokes the condition generator 508 using current input conditions. Condition generator 508 provides a prediction of the next condition. Test case generator 510 uses the next condition to generate input instances, which are used as input to run software or program code, whose test case is being generated. Test case generator 510 uses the program code's data (input/output pairs from running the software) 514 to discover new execution path or flow of control not previously discovered. The new execution path is/are provided as one or more test cases 516.

Figure 6:
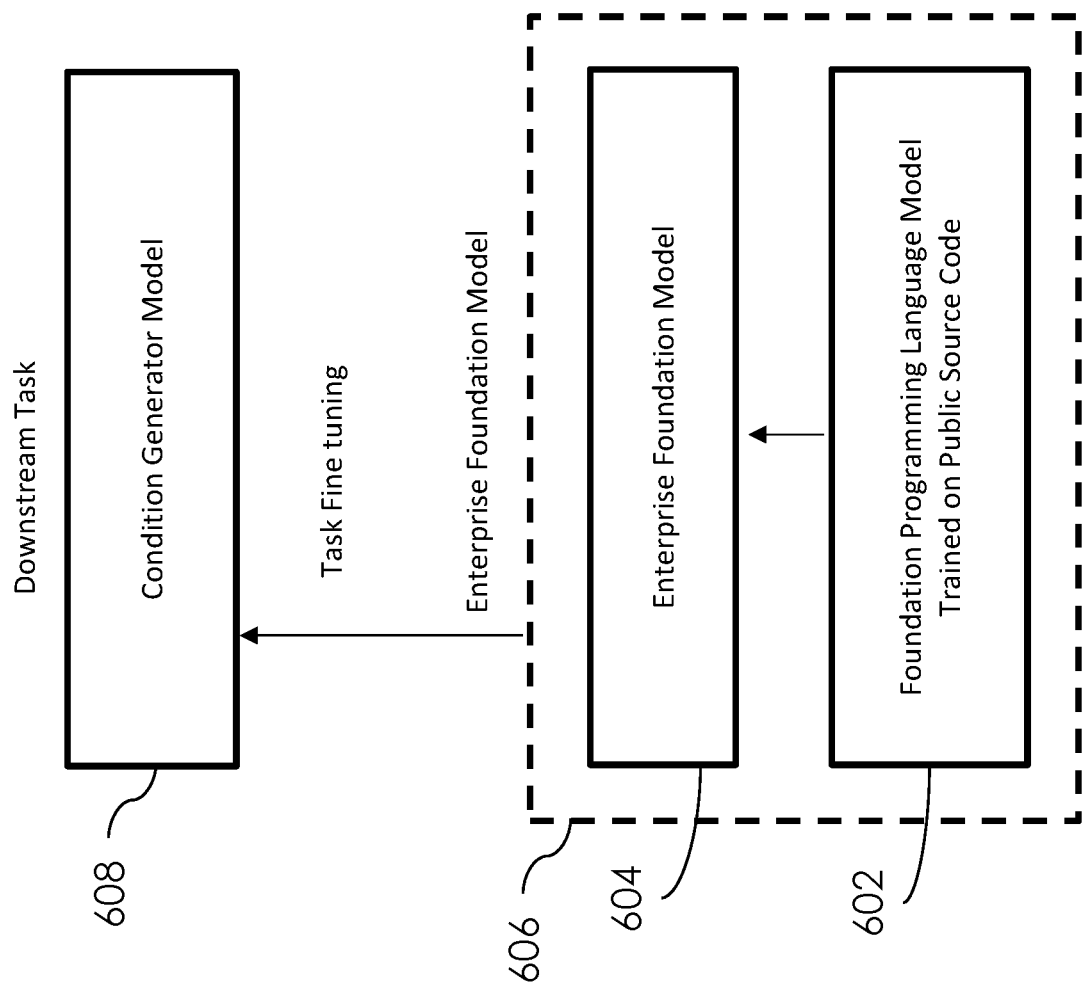
FIG. 6 is a block diagram showing a condition generator model in an embodiment.

FIG. 6 is a block diagram showing a condition generator model in an embodiment. The components shown can be computer-implemented components, functions, and/or modules. Foundation programming language model 602 can be a model trained on public source code. Such pretrained programming language models can be available from public sites and other sources. Some models may also consume semantic-level information such as data flow, during pre-training. Data flow, for example, shows or provides information regarding how variables in the source code are linked or related to the input and output of the source code. Such pre-trained models, which are trained on data flow or data flow graphs, can be useful in generating conditions based on input variables. Examples of possible architectures include Generative Pre-trained Transformer (GPT) and Bidirectional Encoder Representations from Transformers (BERT) based models. The pre-trained models have learned or know the source code well, for example, after pre-training. Enterprise foundation model 604 can be a foundation model retrained or fine-tuned on enterprise-specific source code (e.g., by self-supervised training). In another aspect, the foundation programming language model 604 can be trained on enterprise specific source code entirely, for example, bypassing the use of publicly available foundation programming language mode 602. One or more enterprise-specific foundation models 606, which can be available within an enterprise, can be leveraged for multiple AI-assisted coding tasks, e.g., within the enterprise. For example, enterprises may have such enterprise-specific foundation models 606 to help engineers and programmers in their tasks. An example of an enterprise-specific foundation model 606 may perform an auto-completion task by outputting programming codes, given a code statement.

System and or method, in an embodiment, transforms an enterprise-specific foundation model 606 such that the transformed enterprise-specific foundation model can output a next set of conditions that occur in the source code, given a set of conditions. For instance, task fine tuning transforms the enterprise-specific foundation model 604 to a condition generator model 608 to generate the next condition available in the source code, for example, such that the condition generator model 608 can output a next set of conditions that occur in the source code, given a set of conditions.

Figure 7:
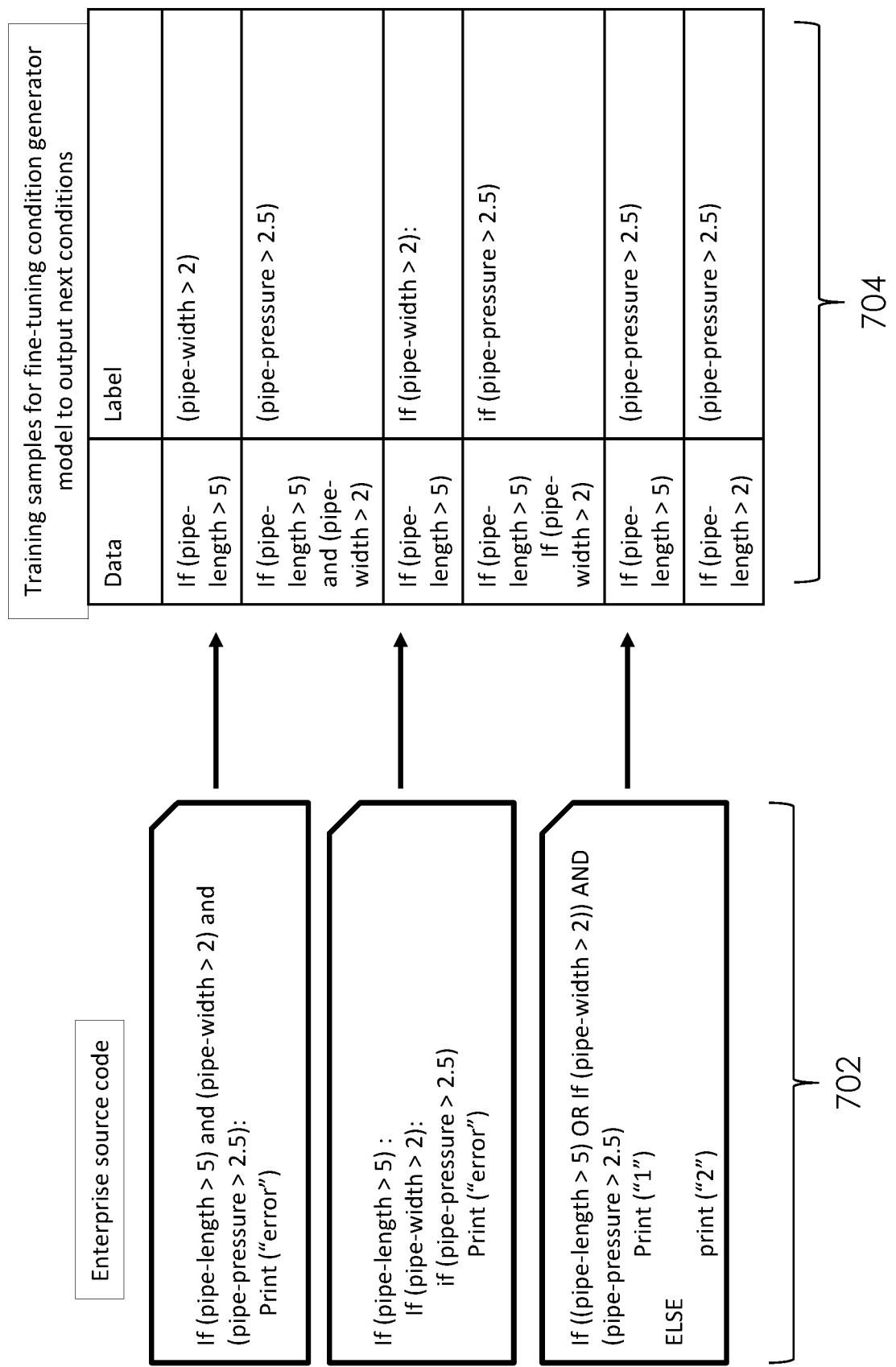
FIG. 7 shows condition extractor for fine-tuning of condition generator model in an embodiment.

Condition generator model 608 can be fine-tuned on condition sequences (e.g., via supervised training). Such fine-tuning can be a downstream task for the enterprise foundation model. In an embodiment, fine-tuning or transforming the enterprise-specific foundation model 604 to the condition generator model 608 can include using labeled data. FIG. 7 shows condition extractor for fine-tuning of condition generator model in an embodiment. For instance, to fine-tune, a small amount of the enterprise source code or labeled data 702 can be scanned. Given the labeled data 702, the condition generator model 608 is trained to learn to output a next set of conditions 704. In this way, rather than (or in addition to) the output of auto-completed code (e.g., which the foundation model 606 can output), the condition generator model 608 can output a next set of conditions.

Generally, very few data samples suffice for fine-tuning foundation models to train them to perform different tasks. Given a condition sequence, condition generator model 608 predicts or auto-completes the next condition, which can be used for efficient test case generation. For example, using example source code 702 (e.g., commonly used pattern in source code) available in enterprise, sequences of labeled conditions 704 can be created as training samples for fine-tuning condition generator model 608 to output next conditions. For example, a sequence of labeled conditions can include: "if (pipe-length>5)" and "(pipe-width>2)". Another sequence of labeled conditions can include: "If (pipe-length>5) and (pipe-width>2)" and "(pipe-pressure>2.5)". Additional examples are shown at 704. Condition extractor (e.g., shown at 506 in FIG. 5) can curate sequences of conditions from enterprise source code 702, which can be utilized (or fed into) to fine-tune the enterprise foundation model (e.g., 606) for the task of generating conditions. By way of example, a foundation model, which can be a neural network, can be fine-tuned, by tuning the last layer or last few layers of that neural network, using the sequences of conditions. For instance, language models can usually be fine-tuned by re-training the last layer or last few layers. Condition generator model 608 predicts and/or auto-completes the next condition from source code. In another embodiment, data augmentation can be implemented. For example, in some cases, the same condition can be expressed in different formats without changing its underlying logic. This step can be used to augment the labeled data set to improve accuracy.

Figure 8:
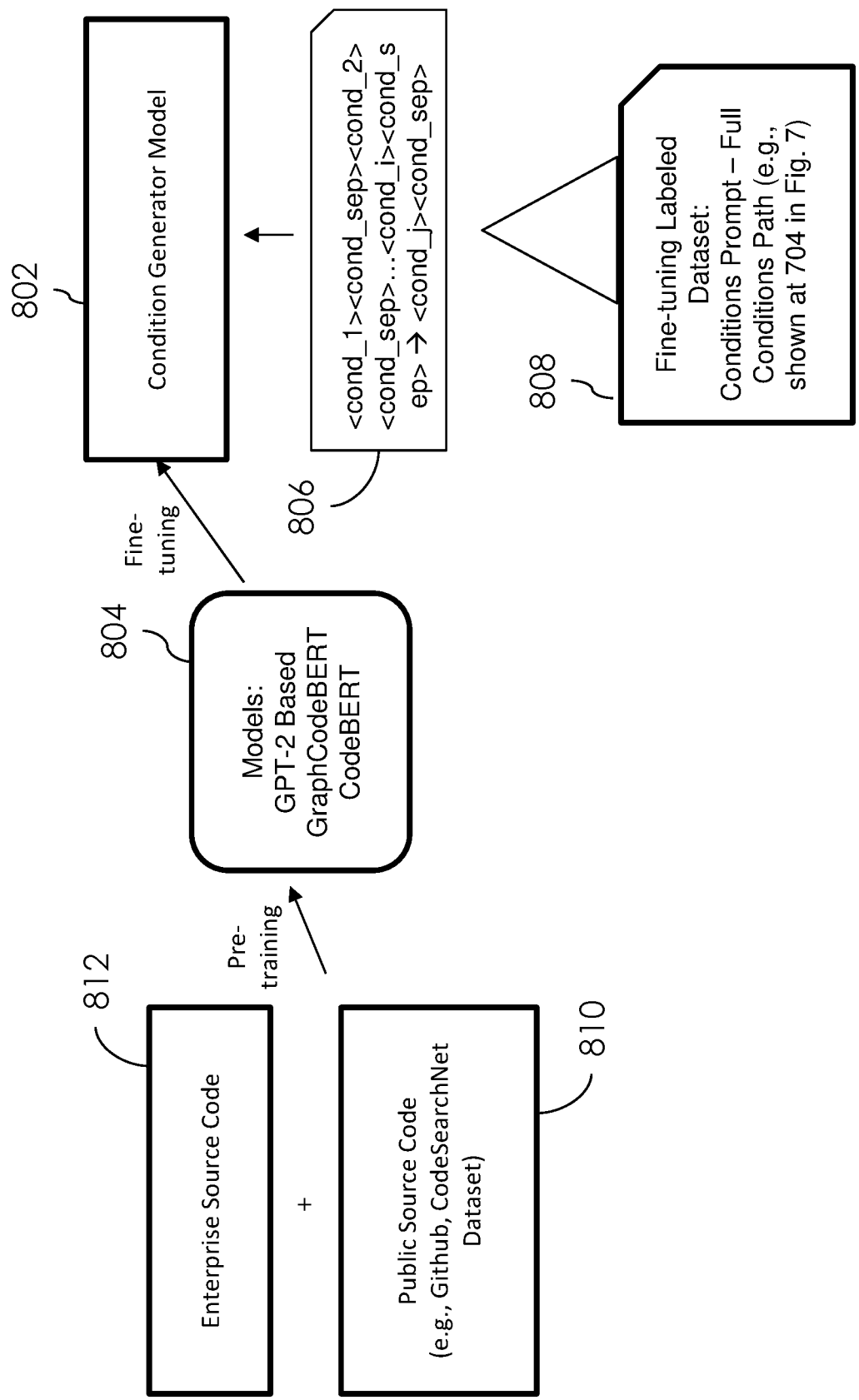
FIG. 8 is a diagram showing fine-tuning process of a condition generator model in an embodiment.

FIG. 8 is a diagram showing fine-tuning process of a condition generator model in an embodiment. The figure shows components, which can be used to implement the fine-tuning task in creating a condition generator model 802. Some of the components can use existing available technologies in implementation. Condition generator model 802, for example, as described above, can be created by fine-tuning a pre-trained foundation programming language model 804, which can be enterprise specific, and which is made available, and using curated sequence of conditions 806 using labeled data set 808 created from available enterprise-specific source code sample (e.g., described with reference to FIG. 7). The pre-trained foundation programming language model 804 has been trained based on dataset that can include publicly available source code 810 and/or enterprise source code 812. Techniques used to pre-train such foundation programming language model 804 can include, but are not limited to, self-training including mask language modeling where the technique hides some random words and iterates the training process of asking the model to predict the random words that were hidden, penalizing or awarding the model for wrong or correct prediction. Other techniques can be used to pre-train foundation programming language model 804. Examples of foundation programming language model 804 can include, but are not limited to, GPT-2 based model, GraphCodeBERT, CodeBERT.

Figure 2:
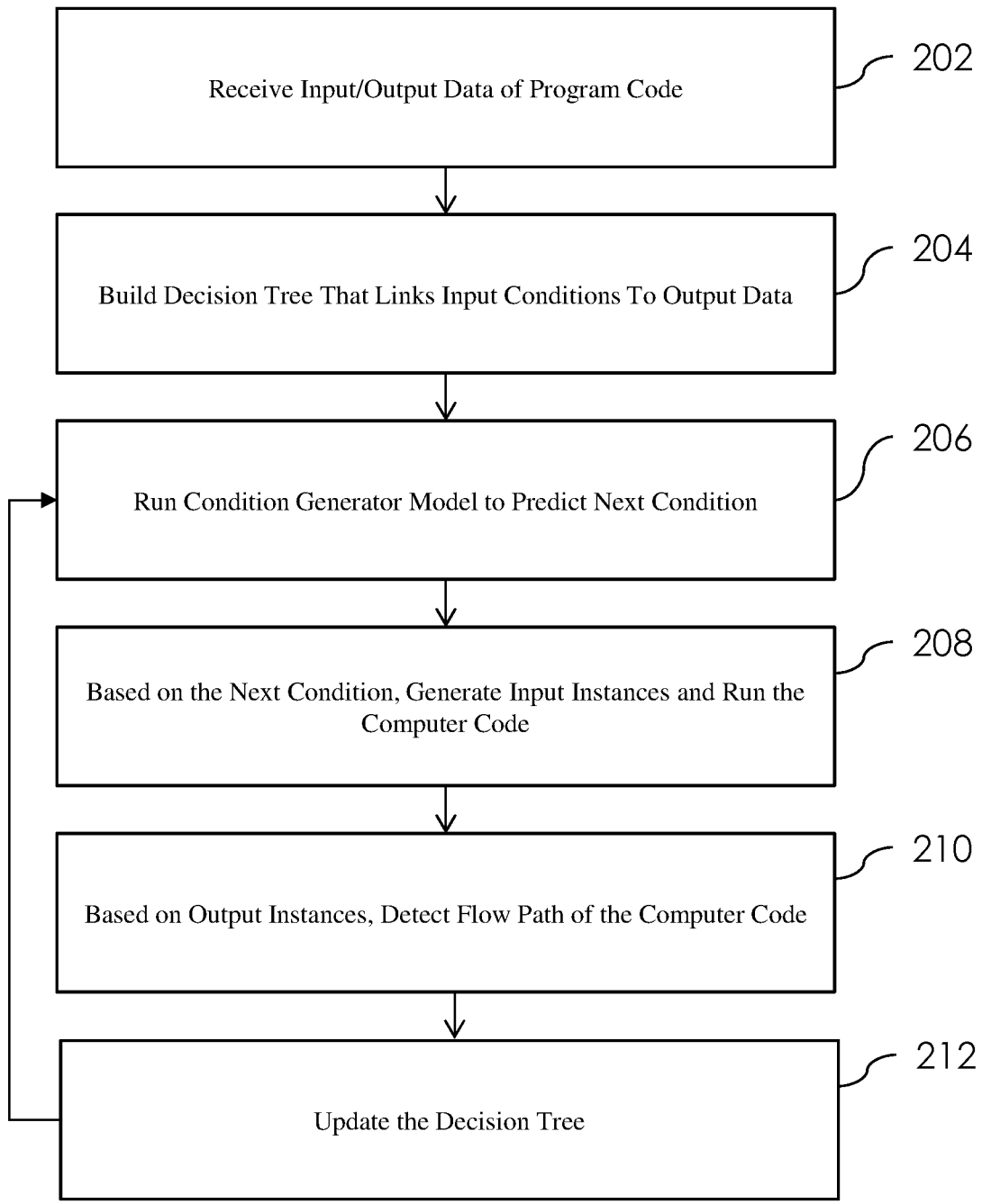
FIG. 2 is a flow diagram illustrating a method in an embodiment.

In an embodiment, for fine-tuning the pre-trained programming language model to create the condition generator model, one or more computer processors, for example, which may run in a computing environment shown in FIG. 1, can extract input variable conditions from a source code sample. Using the extracted input variable conditions, one or more computer processors can create a labeled dataset including sequences of conditions. One or more computer processors can fine-tune at least a last layer of the pre-trained programming language model using the labeled dataset including the sequences of conditions to create the condition generator model.

Fine-tuning to create condition generator model 802 can use techniques such as, but not limited to, prompt based, few-shot learning task, cross entropy loss, and/or others. Possible formulations of fine-tuning task can include encoder-decoder (seq-to-seq task). For example, to leverage the pre-trained models 804 for conditions generation, system and/or method can initialize the encoder with pre-trained models like GraphCodeBERT, CodeBERT 804 and randomly initialize parameters of the decoder. For the generation task, system and/or method can use the decoder model for generation like GPT-2 style by feeding condition prompt to decoder, where the decoder generates a next condition.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    receiving at least input data to a computer code and output data that the computer code produces corresponding to the input data;
    based on the input data and the output data, building a decision tree that links input conditions to the output data;
    using the input conditions, running a condition generator model created by fine-tuning a pre-trained programming language model, the condition generator model predicting a next condition that is likely to occur in the computer code;
    based on the next condition, generating input instances and running the computer code using the generated input instances; and
    based on output instances output by the computer code based on the generated input instances, detecting at least one flow path in the computer code, which had not been previously built in the decision tree,
    wherein fine-tuning the pre-trained programming language model includes:
        extracting input variable conditions from a source code sample;
        using the extracted input variable conditions, creating a labeled dataset including sequences of conditions; and
        fine-tuning at least a last layer of the pre-trained programming language model using the labeled dataset including the sequences of conditions to create the condition generator model.

2. The method of claim 1, wherein the detected at least one flow path is used in test generation for testing the computer code.

3. The method of claim 1, wherein the method further includes updating the decision tree with the predicted next condition and the output instances.

4. The method of claim 1, wherein the pre-trained programming language model is a programming language model trained on publicly available source code data and further re-trained on enterprise-specific source code data.

5. The method of claim 1, wherein the pre-trained programming language model is a programming language model trained on enterprise-specific source code data.

6. The method of claim 1, wherein the pre-trained programming language model is a transformer-based model.

7. A computer program product comprising a computer readable storage medium having program instructions embodied therewith, the program instructions readable by a device to cause the device to:
    receive at least input data to a computer code and output data that the computer code produces corresponding to the input data;
    based on the input data and the output data, build a decision tree that links input conditions to the output data;
    using the input conditions, run a condition generator model created by fine-tuning a pre-trained programming language model, the condition generator model predicting a next condition that is likely to occur in the computer code;
    based on the next condition, generate input instances and run the computer code using the generated input instances; and
    based on output instances output by the computer code based on the generated input instances, detect at least one flow path in the computer code, which had not been previously built in the decision tree, wherein, to fine-tune the pre-trained programming language model, the device is caused to at least:

extract input variable conditions from a source code sample;

using the extracted input variable conditions, create a labeled dataset including sequences of conditions; and fine-tune at least a last layer of the pre-trained programming language model using the labeled dataset including the sequences of conditions to create the condition generator model.

8. The computer program product of claim 7, wherein the detected at least one flow path is used in test generation for testing the computer code.

9. The computer program product of claim 7, wherein the device is further caused to update the decision tree with the predicted next condition and the output instances.

10. The computer program product of claim 7, wherein the pre-trained programming language model is a programming language model trained on publicly available source code data and further re-trained on enterprise-specific source code data.

11. The computer program product of claim 7, wherein the pre-trained programming language model is a programming language model trained on enterprise-specific source code data.

12. The computer program product of claim 7, wherein the pre-trained programming language model is a transformer-based model.

13. A system comprising:

at least one computer processor;

at least one memory device coupled with the at least one computer processor;

the at least on computer processor configure to at least:

receive at least input data to a computer code and output data that the computer code produces corresponding to the input data;

based on the input data and the output data, build a decision tree that links input conditions to the output data;

using the input conditions, run a condition generator model created by fine-tuning a pre-trained programming language model, the condition generator model predicting a next condition that is likely to occur in the computer code;

based on the next condition, generate input instances and run the computer code using the generated input instances; and based on output instances output by the computer code based on the generated input instances, detect at least one flow path in the computer code, which had not been previously built in the decision tree, wherein, to fine-tune the pre-trained programming language model, the at least one computer processor is configured to at least:

extract input variable conditions from a source code sample;

using the extracted input variable conditions, create a labeled dataset including sequences of conditions; and fine-tune at least a last layer of the pre-trained programming language model using the labeled dataset including the sequences of conditions to create the condition generator model.

14. The system of claim 13, wherein the detected at least one flow path is used in test generation for testing the computer code.

15. The system of claim 13, wherein the at least one computer processor is further configured to update the decision tree with the predicted next condition and the output instances.

16. The system of claim 13, wherein the pre-trained programming language model is a programming language model trained on publicly available source code data and further re-trained on enterprise-specific source code data.

17. The system of claim 13, wherein the pre-trained programming language model is a programming language model trained on enterprise-specific source code data.

* * * * *